Patented May 9, 1933

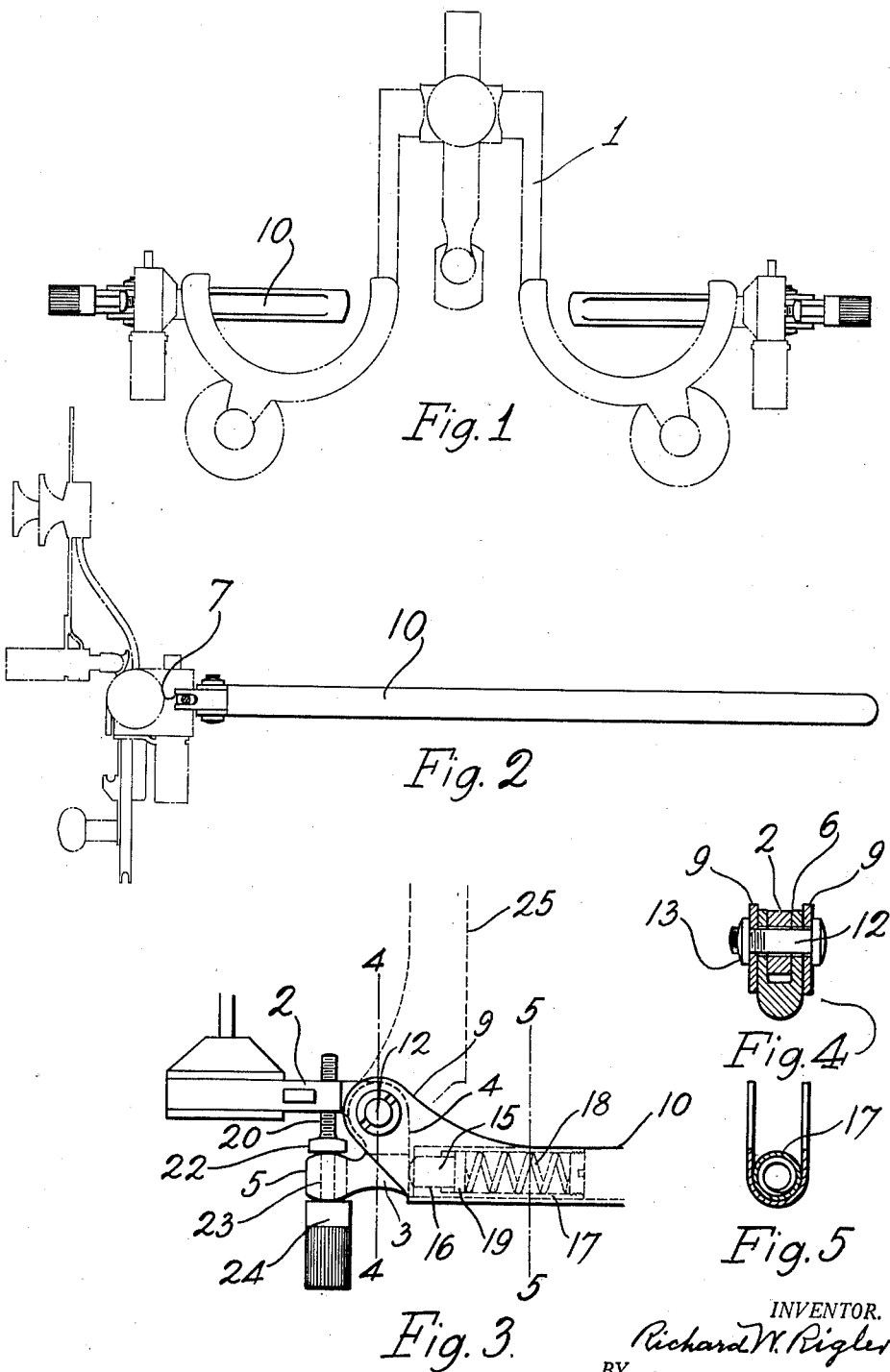

1,908,053

UNITED STATES PATENT OFFICE

RICHARD W. RIGLER, OF PHILADELPHIA, PENNSYLVANIA, ASSIGNOR TO WALL & OCHS, INCORPORATED, OF PHILADELPHIA, PENNSYLVANIA, A CORPORATION OF PENNSYLVANIA

OPHTHALMIC TEST FRAME

Application filed March 17, 1931. Serial No. 523,227.

My invention relates broadly to improvements in ophthalmic test frames and more particularly to means for adjusting the angular relation in a plane extending lengthwise of the frame of the temple bars to the said frame.

The general object of the invention is to provide an improvement in means for limiting the outer swinging movements of the temple bars of ophthalmic test or trial frames.

It also is an object of the invention to provide means of novel construction independent of the temple bars themselves for adjusting and limiting the outer swinging movement of the latter.

A further object of the invention is to provide means of novel construction for limiting the outer swinging movement of the temple bars of ophthalmic test or trial frames which is supported independently of the temple bars and by the employment of which breaking or fracturing of the temple bars or parts thereof is less likely to occur than would be the case if the means to that end was connected directly with the temple bars.

To the foregoing and other ends my invention comprehends the construction as hereinafter described in detail, particularly pointed out in the claims and as illustrated in the accompanying drawing wherein I have shown one embodiment of the invention in a form which at present is preferred by me. However, it will be understood that the invention may be embodied in other forms of construction than that shown and that changes in the retails of construction may be made within the scope of the claims without departing from the invention.

In the drawing:

Fig. 1 is a view in front elevation showing in dash and dot lines the main portion of a test or trial ophthalmic frame and showing also in full lines the portions of the frame embodying the invention;

Fig. 2 is a view in sectional side elevation showing the portion of the structure embodying the invention in full lines while the remaining portion of the frame is indicated in dash and dot lines;

Fig. 3 is a view in top plan of a fragmentary portion of the structure showing the invention;

Fig. 4 is a transverse sectional view taken on the line 4—4 of Fig. 3; and

Fig. 5 is a transverse sectional view taken on the line 5—5 of Fig. 3.

In the drawing I have shown in dash and dot lines the main portion 1 of the frame from the opposite ends of which extend toward the rear temple lugs or projections 2 to which a temple bar adjusting and position controlling device 3 is pivoted, the said device being of bell-crank shape having arms 4 and 5 the outer ends of both of which are slotted as indicated at 6 and 7. The arm 4 extends in a direction generally parallel with the length of the frame 1 while the arm 5 extends in a direction transversely of the plane of the said frame. The projection 2 carried by the frame previously referred to is embraced by the ears provided by the slot 6 while the said ears are in turn embraced by spaced, flat ears or projections 9 which extend forwardly and inwardly from the temple bar 10. The said projections 9 and the arm 4 are pivotally connected with the rearwardly extending lug or projection 2 by means of a headed pivot bolt 12. The latter is retained in place by means of a removable nut 13. It will be apparent that the bell-crank shaped member 3 is pivotally connected to the lug 2 and projections 9 by the pivot bolt 12. The outer end of the rear side of the arm 4 at a point in approximate alignment with the arm 5 contacts with a spring-pressed plunger 15 the outer or front end of which projects through an opening 16 formed in the outer or front end of a tubular housing 17 which is mounted in the hollow front end portion of the temple bar 10. A coiled wire spring 18 is located in the said housing with its rear end seated against the bottom of the housing as shown in Fig. 3 of the drawing, while its outer or front end is seated against the rear side of the head 19 of the plunger 15.

When pushed toward the front by the spring 18 the front side of the outer edge of the head contacts with the portion of the front end of the housing 17 surrounding the opening 16 therethrough to limit the outward movement of the plunger 15.

For the purpose of angularly adjusting the temple bar 10 about the pivot 12 I have provided an adjusting device consisting of a screw 20 which is in engagement with a screw-threaded opening provided in the lug 2 in front of the rear end thereof. The said screw is provided with an intermediate enlarged head-like portion 22, an extended reduced portion 23 and an outer knurled head portion 24 for use in turning the same. The reduced portion 23 is of small diameter compared with the portions 22 and 24 and extends through the notch or slot 7 provided in the outer end of the arm 5 of the device 3. The latter is located between the enlarged portions 22 and 24. It will be noted that the inner and outer edges of the arm 5 are rounded or curved so as to facilitate the turning of the device 3 with respect to the enlarged portions 22 and 24 upon the longitudinal or axial adjustment of the screw 20.

It will be apparent that upon an outward adjustment of the screw 20 the device 3 is turned in a counter-clockwise direction about the pivot bolt 12 to cause rearward pivotal adjustment thereof to reduce the extent of the outward pivoted movement of the temple bar. If, on the contrary, the screw is adjusted inwardly the device 3 is caused to turn in the opposite or clockwise direction about the pivot bolt 12 so as to permit a greater outward movement or spreading of the temple bar 10. The slot or notch 7 in the outer end of the arm 5 is of a depth sufficient to permit such pivotal movement of the device 3.

The presence of the plunger 15 and the spring 18 pressing against the latter to hold it outwardly or toward the front provides a yielding relationship between the device 3 and the temple bar 10 whereby the liability to breakage of any part of the latter is much less likely to occur than is the case with constructions of the character heretofore known. The presence and employment of the adjusting device comprising the part 3 and the means for adjusting the latter do not at all interfere with the collapsing or movement of the temple bars into closed or shut position as indicated by the dash lines 25 in Fig. 3 of the drawing. In the description of my invention I have referred to a single connection between a temple bar and the frame but it will be understood that each completed test frame will include two connections.

Having thus described my invention what I claim and desire to secure by Letters Patent is:

1. In an ophthalmic test frame, the combination of a temple lug extending rearwardly from one end of said frame, a temple bar, a lever interposed between said temple lug and said temple bar, a pivot for connecting the front end of the said temple bar and one end of the said lever to the said temple lug, and means interconnecting said temple lug and said lever for adjusting the said lever about its pivot to control the extent of outward pivotal movement of the said temple bar.

2. In an ophthalmic test frame, the combination of an arm extending rearwardly from one end of said frame, said arm terminating at its rear end in a temple lug, a temple bar, a lever interposed between said temple lug and said temple bar, a pivot for connecting the front end of said temple bar and one end of said lever to the said temple lug, and a screw having adjustable connection with the arm and also having connection with the said lever for causing pivotal movement of the latter to vary the limit of the outer swinging movement of the said temple bar.

3. In an ophthalmic test frame, the combination of a temple lug extending rearwardly from one end of the said frame, a temple bar, a lever interposed between said temple lug and said temple bar, a pivot connecting the said temple bar and lever to the said temple lug, means having adjustable connection with a portion of the test frame and with the said lever for causing pivotal adjustments of the latter, and yielding means interposed between the said lever and the said temple bar.

4. In an ophthalmic test frame, the combination of a temple lug extending rearwardly from an end of said frame, a temple bar, a lever interposed between said temple lug and said temple bar, a pivot for connecting the said temple bar at its front end and the said lever at its inner end to the said temple lug, adjustable means having connection with a portion of the test frame and with the said lever for pivotally adjusting the latter about the said pivot to adjust the temple bar upon said pivot, and a spring-pressed plunger mounted upon the front end portion of the said temple bar and adapted to engage one side of the said lever.

5. In an ophthalmic test frame, the combination of a temple lug which projects rearwardly from an end of the said frame, an angular lever one arm of which extends in a direction lengthwise of the said frame and the other end of which extends in a direction transversely of the plane of said frame, a temple bar, a pivot which connects the first named end of the said lever and the front end of said temple bar to the temple lug, the second named end of the said lever having a slot extending horizontally therethrough, and a device having adjustable connection with a portion of the said frame and also engaging the said slot in the second named end of the said lever whereby upon adjustment of the said adjustable device pivotal movement of the said lever is effected.

6. In an ophthalmic test frame, the combination of a temple lug projecting rearwardly from an end of the said frame, a bell-crank lever one arm of which extends in a direction lengthwise of the said frame and the other arm of which extends in a direction transversely of the said frame, a temple bar, a pivot which connects the first named arm of the said bell-crank lever and the front end of the said temple bar to the temple lug, and a device having screw-threaded connection with the front portion of the said temple lug and also having connection with the second named arm of the said bell-crank lever whereby upon adjustment of the said device the said bell-crank lever is adjusted about its pivot.

7. In an ophthalmic test frame, the combination of a temple lug projecting rearwardly from an end of the said frame, a bell-crank lever one arm of which extends in a direction lengthwise of the said frame and the other arm of which extends in a direction transversely of the said frame, a temple bar, a pivot which connects the first named arm of the said bell-crank lever and the front end of the said temple bar to the temple lug, a device having screw-threaded connection with the front portion of the said temple lug and also having connection with the second named arm of the said bell-crank lever whereby upon adjustment of the said device the said bell-crank lever is adjusted about its pivot, and yielding means interposed between the said bell-crank lever and the said temple bar.

8. In an ophthalmic test frame, the combination of an arm extending rearwardly from an end of the said frame and terminating at its rear end in a temple lug, a bell-crank lever one arm of which extends in a direction lengthwise of the said frame and the other arm of which extends in a direction transversely of the said frame, a temple bar having at its front end inwardly and forwardly extending spaced ears, a pivot for pivotally connecting the first named arm of the said bell-crank lever and the said ears to the said temple lug, a device having a screw-threaded portion in engagement with the said first named arm, said device extending transversely of the said arm and also having a portion in engagement with the outer end of the second named arm of the said bell-crank lever, a plunger mounted in the front end of the said temple bar, and yielding means for causing the front end of said plunger to project beyond the front end of said temple bar, the front end of said plunger adapted to yieldingly engage the rear side of the said bell-crank lever.

9. In an ophthalmic test frame, the combination of a temple lug, a temple bar, a bell-crank lever interposed between said temple lug and said temple bar, a pivot for pivotally connecting the said temple bar and bell-crank lever to the said temple lug, and means for adjusting the said bell-crank lever about the said pivot for varying the limit of the outer swinging movement of the said temple bar.

In testimony that I claim the foregoing as my invention, I have hereunto signed my name this 14th day of March, A. D., 1931.

RICHARD W. RIGLER.